C. W. MUELLER.
FISH AND CRAB TRAP.
APPLICATION FILED OCT. 4, 1919.

1,339,275.

Patented May 4, 1920.

WITNESSES

INVENTOR
C. W. Mueller
BY
ATTORNEYS

UNITED STATES PATENT OFFICE.

CHARLES W. MUELLER, OF JERSEY CITY, NEW JERSEY.

FISH AND CRAB TRAP.

1,339,275.     Specification of Letters Patent.     Patented May 4, 1920.

Application filed October 4, 1919. Serial No. 328,396.

*To all whom it may concern:*

Be it known that I, CHARLES W. MUELLER, a citizen of the United States, and a resident of Jersey City, in the county of Hudson and State of New Jersey, have invented a new and Improved Fish and Crab Trap, of which the following is a full, clear, and exact description.

This invention relates to fishing tackle, and particularly to a fishing trap for catching crabs, lobsters, fish and the like.

An object of the invention is to provide a collapsible form of fish and crab trap which is convenient in transportation from place to place. A particular feature of the invention relates to a foldable frame on which the netting is applied. This permits the owner of the trap to adequately fold it up until it assumes a compact single one-piece package.

It is a further object to provide a fish and crab trap simple in construction, comprising few parts, and which will be strong and durable in construction and use.

With the above principal objects and others in view, the invention relates to the crab and fish trap disclosed herein and illustrated in the accompanying drawings, wherein.

Figure 1:
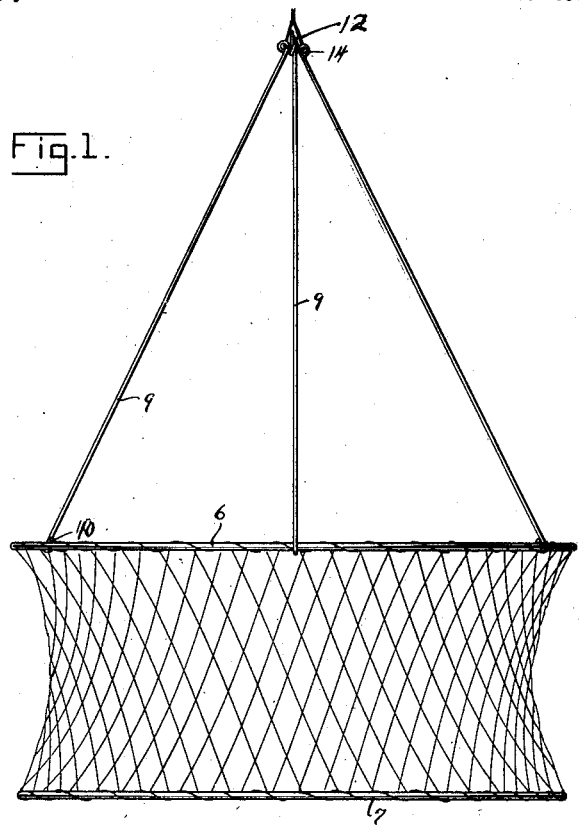
Figure 1 shows the crab and fish trap in open position ready for use.

A crab and fish trap constructed in accordance with this invention comprises a pair of rings carrying the trap netting. One ring is preferably smaller than the other so that it may assume a concentric position with the larger frame ring when the trap is closed for transportation. A number of support rods are attached to the upper frame ring, and adapted to be fastened to a rope or cord by which the trap is let down into the water for fishing purposes.

In further describing my invention and in referring to the details of the drawings, the reference characters 6 and 7 designate a pair of ring frame members with trap netting applied thereto. The netting is fastened across one ring frame to form a bottom, and brought up around the sides and attached to the top ring to form an inclosed net trap. The lower ring 7 is slightly less in diametral size than the upper ring 6 which permits the lower ring to lie concentric within the upper larger ring, and when in this concentric position the fabric netting is folded and placed between the ring members as shown in the plan Fig. 2.

The upper ring 6 is fitted with a plurality of hanger rods 9. One end of each rod is provided with a loop or curl 10 bent around the frame ring 6 to securely hold hanger rods 9 thereto. Rods 9 may be pivoted up and down to assume an upwardly arranged position as shown in Fig. 1, or to lie down on the frame ring 6 as shown in the Figs. 2 and 3.

Figure 4:
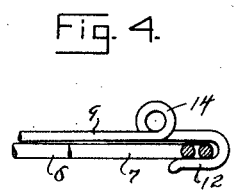
Fig. 4 shows a detailed fragmentary view of one of the support rods employed in connection with the trap, and shows how a hook engages both frame rings to hold them in folded position.

The other ends of the hanger rods, that is to say the free unattached end of said rods, are provided with a hook 12 which is made on the extremity of the rod by bending the end down and around a form to secure the shape of hook shown in Fig. 4. Adjacent to hook 12 is formed a coil 14, said coil being provided on the upper free end of each rod.

In opening up the fish trap and making it ready for work, the hanger rods will be placed in position as shown in Fig. 1 which disposes the several coils 14 adjacent one another and permits a rope or cord to be passed through the coils. The trap is then suspended on the rope or cord and let down into the water.

Figure 2:
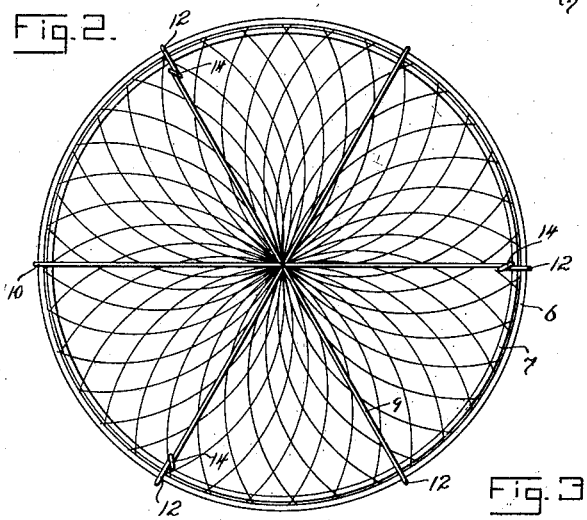
Fig. 2 shows the crab and fish trap in a folded position, the view being made in plan.
Figure 3:
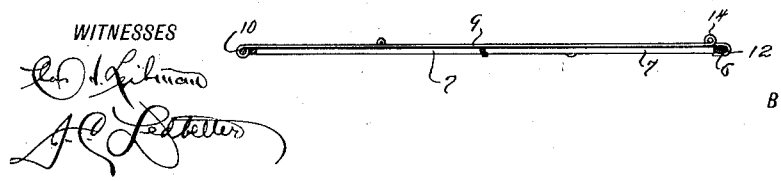
Fig. 3 illustrates a pair of major frame members placed one within the other with the netting removed to disclose structural features of the trap. This view discloses the compactness of the frame structure when placed in a folded and closed position.

In folding up the trap, the cord or rope is removed from coils 14 and each rod 9 folded down against the ring frame 6. The larger ring is sprung or distorted in order to engage the hook 12 of each rod over the concentric rings. This fastens all the hanger rods down against the trap frame and prevents the rods from dangling around in an inconvenient manner during transportation of the fish trap, and further holds the several parts of the trap in positively closed position. Figs. 2, 3, and 4 illustrate this closed position of the frame parts and hanger rods. The hook 12 is so constructed as to hook over and fasten both rings 6 and 7 together in a substantially close and concentric relation.

Having thus described my invention, what

I claim as new and desire to secure by Letters Patent is:

1. A fish and crab trap consisting of a frame with netting, a plurality of hanger rods connected at one end with the frame and capable of being moved down against the frame, a hook formed on the other end of each hanger rod to engage the frame to hold the hanger rod against the frame while in transit.

2. A fish and crab trap consisting of a frame with netting, a plurality of hanger rods connected at one end with the frame and capable of being moved down against the frame, a hook formed on the other end of each hanger rod to engage the frame to hold the hanger rod against the frame while in transit, and a coil to receive a rope made on each rod adjacent the hook.

3. A fish and crab trap comprising: a pair of netting frame members, one member slightly smaller than the other member to permit a folded concentric relation between the pair of frame members, netting attached to the frame members, hanger rods attached to one of the frame members for connecting with a cord for lowering the trap into the water, and hooks applied to the outer free end of the hanger rods to hook over and engage both frame members when the trap is closed in a folded position.

4. A fish and crab trap comprising: a pair of rings, one ring slightly smaller than the other to allow the smaller ring to fit into the larger ring, hanger rods attached at one end to one ring, hooks formed on the other end of the hanger rods to hook around and engage both rings in order to fold the entire frame structure into a single compact bundle, and netting applied to the rings.

CHARLES W. MUELLER.